United States Patent [19]

Yamamoto et al.

[11] Patent Number: 4,910,723

[45] Date of Patent: Mar. 20, 1990

[54] TRACKING SERVO DEVICE FOR OPTICAL STORAGE DISK USING OPTICAL DEFLECTOR ELEMENT FOR ADJUSTING BEAM SPOT ON THE DISK

[75] Inventors: Takemi Yamamoto; Makoto Suzuki, both of Nagoya, Japan

[73] Assignee: Brother Kogyo Kabushiki Kaisha, Aichi, Japan

[21] Appl. No.: 77,872

[22] Filed: Jul. 27, 1987

[30] Foreign Application Priority Data

Jul. 31, 1986 [JP] Japan .................. 61-180346

[51] Int. Cl.[4] .................. G11B 7/135; G11B 7/09; G02B 6/10
[52] U.S. Cl. .................. 369/44; 369/112
[58] Field of Search .................. 369/44, 46, 121, 112; 350/96.13

[56] References Cited

U.S. PATENT DOCUMENTS 4,478,483 10/1984 Sprague .................. 369/112
4,718,052 1/1988 Kondo et al. .................. 369/44
4,747,090 5/1988 Yamashita et al. .................. 369/45
4,767,170 8/1988 Mizutani et al. .................. 350/96.13

OTHER PUBLICATIONS

Takizawa, *Electrooptic Fresnel Lens–Scanner with an Array of Channel Waveguides*, 8/15/83, Applied Optics, pp. 2468–2473.

*Primary Examiner*—Alan Faber
*Assistant Examiner*—James Tomassini
*Attorney, Agent, or Firm*—Oliff & Berridge

[57] ABSTRACT

A tracking servo device for changing a position on an optical storage disk, at which the storage disk is irradiated by a light beam. The servo device is responsive to a tracking error signal indicative of a deviation of the irradiated position on the disk with respect to a recording track provided on the disk. The tracking servo device includes an optical deflector element having a waveguide disposed in a path of the light beam, for guiding the light beam therethrough toward a surface of the optical storage disk, so as to deflect the light beam during propagation thereof through the waveguide. The device further has a deflection control arrangement for controlling an angle of deflection of the light beam by the optical deflector element, based on the tracking error signal.

3 Claims, 4 Drawing Sheets

TRACKING SERVO DEVICE FOR OPTICAL STORAGE DISK USING OPTICAL DEFLECTOR ELEMENT FOR ADJUSTING BEAM SPOT ON THE DISK

BACKGROUND OF THE INVENTION

1. Field of the Invention

The present invention relates to a tracking servo device for directing a light beam to a recording track on an optical data storage disk, to irradiate the recording track.

2. Discussion of the Prior Art

Conventionally, such a tracking servo device is operated based on a tracking signal indicative of an amount of deviation of an irradiated position on an optical storage disk, with respect to a target recording track on the disk. The deviation is detected, for example, by a three-beam method. The tracking servo device uses a voice coil responsive to the tracking error signal, to adjust the irradiated position on the disk.

Since such a known tracking servo device employs a mechanically operated arrangement driven by a voice coil or other drive means to change a path of the light beam, the servo device tends to be bulky, and consequently suffer from low operating response and durability.

SUMMARY OF THE INVENTION

The present invention was developed in the light of the above problems experienced in the prior art. It is accordingly an object of the invention to provide an improved tracking servo device for changing an irradiated position on an optical storage disk, based on a tracking error signal, which is compact in construction, and has high operating response and durability.

The above object may be achieved according to the principle of the present invention, which provides a tracking servo device for changing a position on an optical storage disk, at which the storage disk is irradiated by a light beam, the servo device being responsive to a tracking error signal indicative of a deviation of the position with respect to a recording track provided on the storage disk, the tracking servo device comprising: (a) an optical deflector element including a waveguide disposed in a path of the light beam, for guiding the light beam therethrough toward a surface of the optical storage disk, so as to deflect the light beam during propagation thereof through the waveguide; and (b) deflection control means for controlling an angle of deflection of the light beam by the optical deflector element, based on the tracking error signal.

In the tracking servo device of the present invention constructed as described above, the light beam is directed to the surface of the optical storage disk, through the waveguide of the optical deflector element, and is deflected during propagation through the waveguide. The angle of deflection of the waveguide by the optical deflector element is controlled by the deflector control means, based on the tracking error signal which represents an amount of deviation of the irradiated position on the storage disk, with respect to the target recording track.

As indicated above, the position at which the storage disk is irradiated by the light beam is changed by controlling the angle of deflection of the light beam by the optical deflector element which is not mechanically operated. Thus, the instant tracking servo device requires no mechanically operated components, and is accordingly reduced in size and weight, whereby the operating response and durability are improved.

According to one feature of the invention, the optical deflector element consists of a thermo-optical element, and the deflection control means comprises means for changing a temperature gradient in the optical waveguide. In one form of this feature, the thermo-optical element comprises a transparent substrate having a flat surface on which the waveguide is formed, and a heat-generating layer formed on the waveguide and having lateral edges parallel to the path of the light beam. The waveguide has a higher refractive index than that of the substrate. In this case, the means for changing the temperature gradient is adapted to control an electric current applied to the heat-generating layer.

According to another feature of the invention, the optical deflector element consists of an electro-optical element, and the deflection control means comprises means for changing an electric field produced in the waveguide. In one form of this feature, the electro-optical element comprises a transparent substrate having a flat surface on which the waveguide is formed, and a plurality of electrode layers formed on the waveguide such that the electrode layers are spaced apart from each other in a plane parallel to the flat surface, and such that the light beam travels through the electric field produced between the electrode layers. In this case, the means for changing the electric field is adapted to control a voltage applied to the electrode layers.

According to a further feature of the invention, the optical deflector element consists of an acousto-optical element, and the deflection control means comprises means for changing a wavelength of a surface acoustic wave to which the waveguide is exposed. In one form of this feature of the invention, the acousto-optical element comprises a transparent substrate having a flat surface on which the waveguide is formed, and an oscillator formed on the waveguide to generate the surface acoustic wave in a direction which intersects the path of the light beam. In this case, the means for changing the wavelength of the surface acoustic wave is adapted to control a high-frequency electric current applied to the oscillator.

BRIEF DESCRIPTION OF THE DRAWINGS

The above and optional objects, features and advantages of the present invention will become more apparent by reading the following detailed description of preferred embodiments of the invention, when considered in conjunction with the accompanying drawings, in which.

DETAILED DESCRIPTION OF THE PREFERRED EMBODIMENTS

Figure 1:
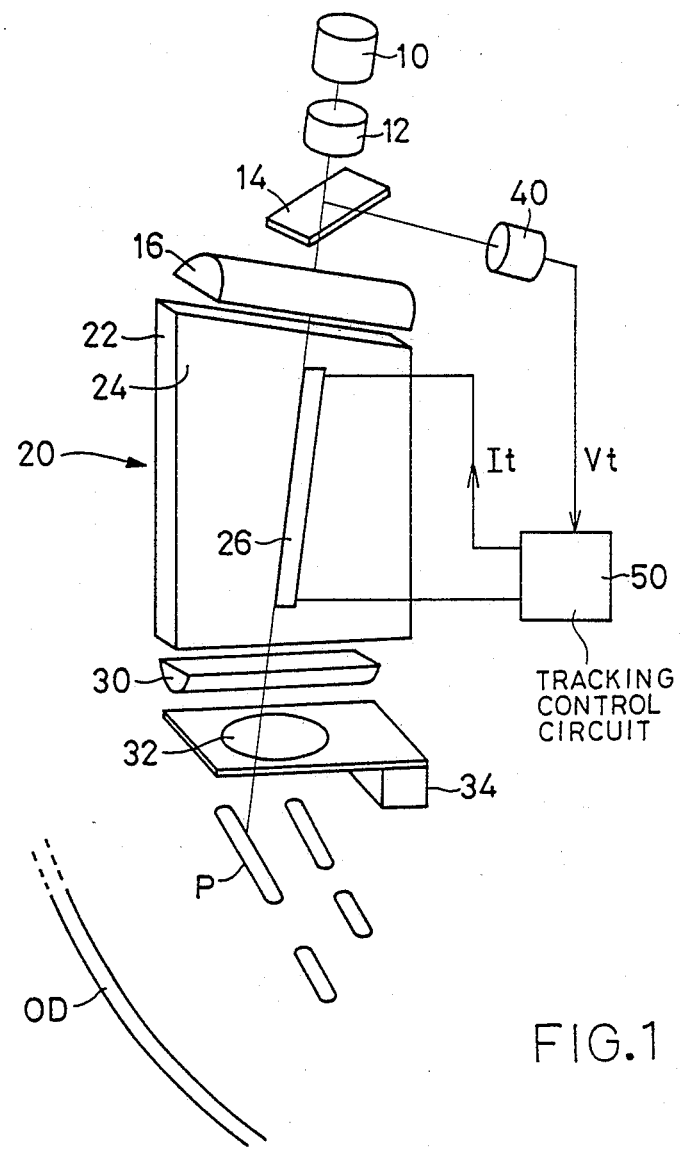
FIG. 1 is a schematic perspective view of an optical pickup system for an optical storage disk, incorporating one embodiment of a tracking servo system of the present invention.
Figure 2:
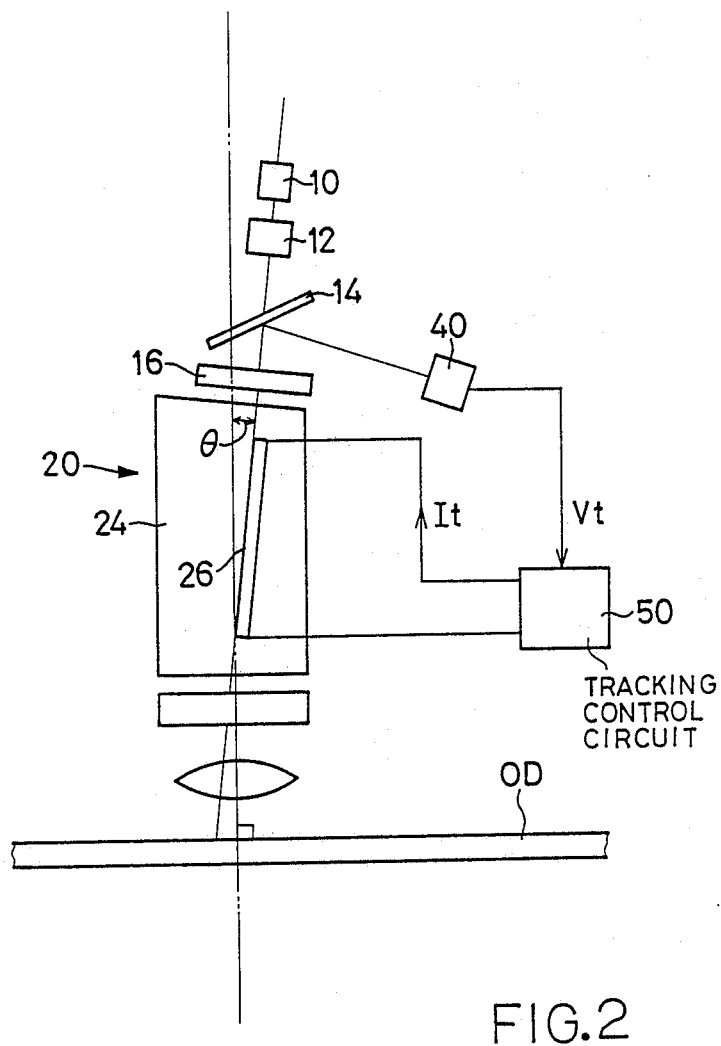
FIG. 2 is a schematic elevational view of the pickup system of FIG. 1.

Referring first to FIGS. 1 and 2, there is shown an optical pickup system for an optical storage disk OD, which incorporates the first embodiment of a tracking servo device according to the invention.

Figure 3:
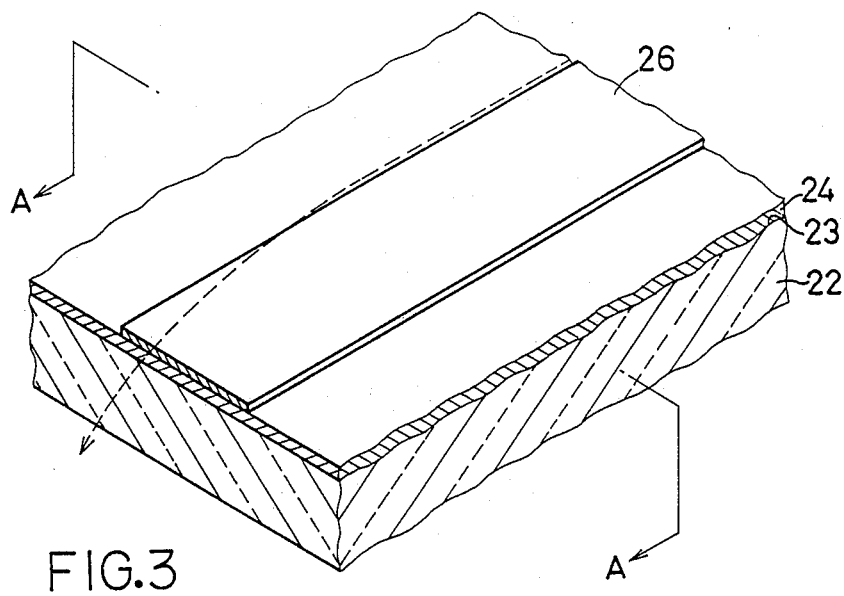
FIGS. 3 and 4 are views of an optical deflector element including a two-dimensional waveguide, explaining an operation of the tracking servo system.

In the figures, a laser beam is produced by a semi-conductor laser element 10 which is disposed at an angle $\theta$ with respect to an axis of rotation of the optical disk OD. The laser beam produced by the laser element 10 is incident upon a collimating lens 12, and is collimated into parallel rays of light. The laser beam is then passed through a half mirror 14, and is condensed by a cylindrical lens 16, for transmission through a two-dimensional optical deflector element in the form of a thermo-optical element 20, which utilizes a thermo-optical effect. As illustrated in enlargement in the fragmentary perspective view of FIG. 3, the thermo-optical element 20 consists of a substantially rectangular transparent substrate 22, a two-dimensional optical waveguide 24 formed on a flat surface 23 of the substrate 22, and a heat-generating layer 26 formed on the waveguide 24. The optical waveguide 24 is made of a material having a higher refractive index than that of the substrate 22. The heat-generating layer 26 is formed so as to extend in a direction parallel to a direction of propagation of the laser beam through the waveguide 24. Namely, the element 20 is disposed such that the surface 23 is substantially perpendicular to the surface of the disk OD. For example, the transparent substrate 22 is formed of a material such as soda glass, optical glass, lead lanthanum zirconate titanate [$(Pb_{1-x}La_x)(Zr_yTi_{1-y})_{1-x/4}O_3$] abbreviated as PLZT, lithium niobate ($LiNbO_3$), and lithium tantalate ($LiTaO_3$). The waveguide 24 is formed by subjecting the flat surface 23 to a suitable treatment. For instance, if the substrate 22 is made of a glass, the waveguide 24 having a high refractive index may be formed by ion exchange in a solution of silver nitrate, potassium nitrate, or thallium nitrate. If the substrate 22 is formed of PLZT, a thin film of a suitable material may be used as the waveguide 24. If the substrate 22 is formed of lithium niobate, the waveguide 24 may be formed by thermal diffusion of titanium by sputtering on the surface 23 of the substrate 22. The heat-generating layer 26 may be formed of a suitable material such as titanium or tantalum nitrate, by a suitable method, such that the layer 26 extends parallel to the waveguide 24, i.e., parallel to the path of the laser beam through the waveguide 24.

The optical deflector element 20 is disposed so that the opposite longer edges of the heat-generating layer 26 are parallel to a path of the incident laser beam, as indicated in FIGS. 1 and 2. The laser beam which has been transmitted through the waveguide 24 is collimated by a cylindrical lens 30 into parallel rays, to collimate the beam into parallel rays of light parallel to the plane of the deflector element 20. Then, the laser beam is focused by a convex lens 32, on the surface of the optical storage disk OD. The laser beam is reflected by the surface of the disk OD, and the reflected beam travels along the light path in the opposite direction from the convex lens 32 toward the half mirror 14, so that the reflected beam is again reflected by the half mirror 14 and is incident upon an information-reading detector (not shown) and a tracking error detector 40. The disk OD is formed with a multiplicity of recording pits P on its surface. Information of whether any pit P exists in the irradiated area or not is sensed by the information-reading detector, as two different intensities of the laser beam reflected by the irradiated area. Thus, the recorded information can be read in an ordinary manner, as the presence or absence of the pits P on the disk OD. The reflected laser beam from the half mirror 14 is also received by the tracking error detector 40. This detector 40 is adapted to generate a tracking error signal in the form of a voltage signal Vt which is proportional to the intensity of the laser beam reflected by the specific spot on the storage disk OD. Namely, the voltage signal Vt as the tracking error signal represents an amount of deviation of the irradiated position on the disk OD, from the target recording track on which the pits P to be read are disposed. The voltage signal Vt is applied to a tracking control circuit 50 for controlling the optical deflector element 20. More specifically, the tracking control circuit 50 is adapted to supply the heat-generating layer 26 with a controlled electric current It corresponding to the tracking error signal or voltage signal Vt received from the tracking error detector 40.

Reference numeral 34 designates a voice coil for supporting the convex lens 32, such that a distance between the convex lens 32 and the optical disk OD may be adjusted by the voice coil, in response to a focusing error signal received from a suitable detector (not shown).

Figure 4:
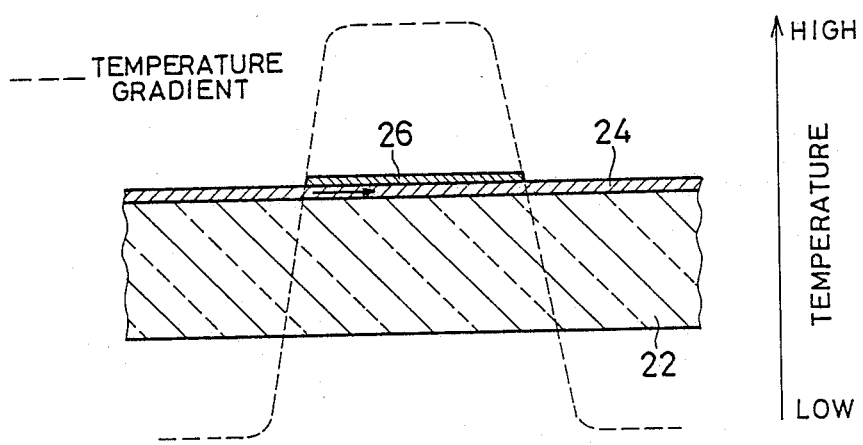

The tracking servo device constructed as described above is operated in the following manner:

When a controlled electric current It corresponding to the tracking error signal Vt from the detector 40 is applied from the tracking control circuit 50 to the heat-generating layer 26 of the optical deflector element 20, the heat-generating layer 26 generates a thermal energy equal to $It^2 \cdot R$, where R represents an electrical resistance of the layer 26. As a result, a temperature gradient as indicated in dashed line in FIG. 4 (cross sectional view taken along line A—A of FIG. 3) appears in the optical deflector element 20. As is well known in the art, the thermo-optical element 20 therefore has a gradient of refractive index corresponding to the temperature gradient. That is, the element 20 has a refractive index gradient as indicated in the dashed line in FIG. 4. Accordingly, the component of the laser beam travelling along the left-hand side edge of the heat-generating layer 26 is deflected to the right, since the central portion of the element 20 has a higher refractive index than the portions adjacent to the edges of the heat-generating layer 26. In this manner, the laser beam travelling through the waveguide 24 of the deflector element 20 is deflected in the radial direction of the optical storage disk OD, as is apparent from FIGS. 1 and 2, whereby the irradiated position on the disk OD can be changed in the radial direction.

It follows from the above description that the instant tracking servo device does not use any mechanically operated component for controlling the irradiated position on the optical storage disk OD, with respect to the recording tracks. This elimination of a mechanical component results in reducing the size and weight of the servo device, thereby improving the operating reliability and response.

Figure 5A:
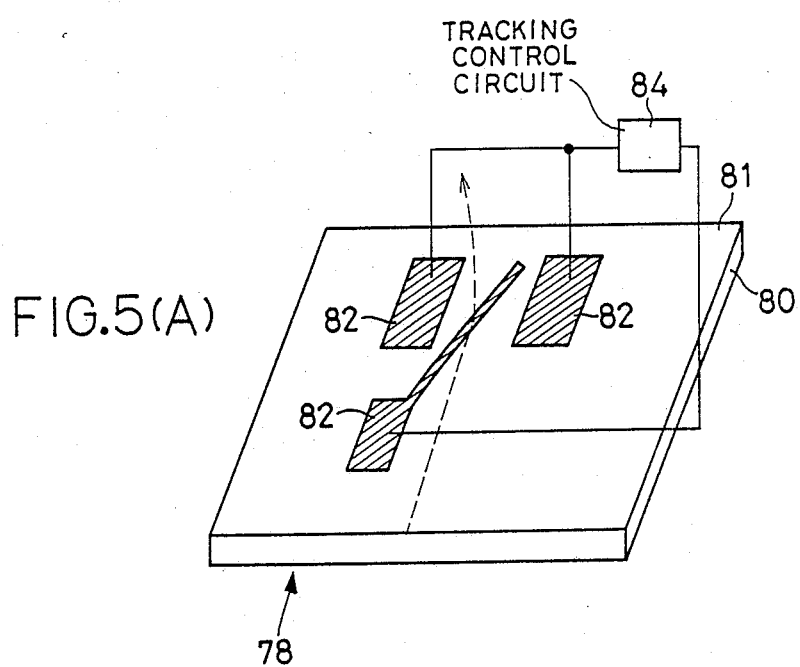
FIG. 5(A) and FIG. 5B are schematic views showing other embodiments of the present invention.
Figure 5B:
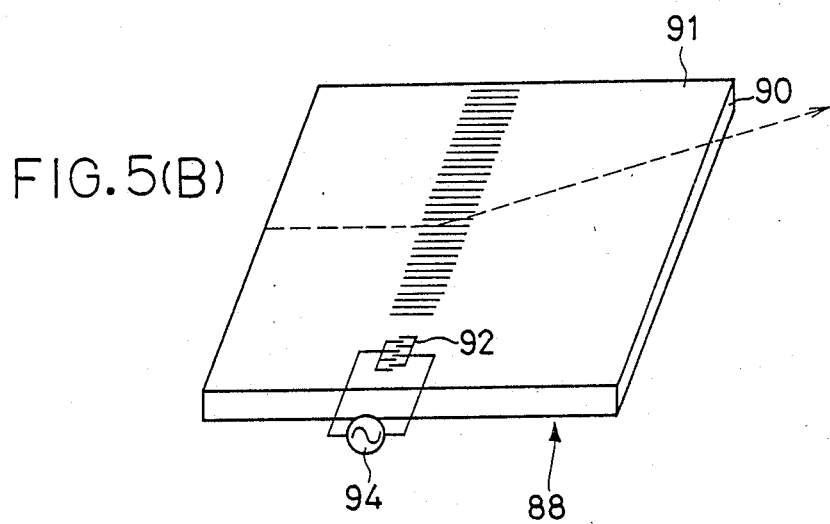

Referring next to FIGS. 5(A) and 5(B), there will be described modified embodiments of the tracking servo device of the present invention, which use different types of optical deflector elements generally indicated at 78 and 88 in the figures.

In the second embodiment of FIG. 5(A), the optical deflector element 78 consists of an electro-optical element which utilizes an electro-optical effect in which the angle of deflection of a light beam travelling therethrough is changed according to the intensity and direction of an electric field to which the electro-optical material is exposed.

The electro-optical element 78 includes a transparent substrate 80 having an electro-optical effect. For example, the substrate 80 is formed of lead lanthanum zirconate titanate [$(Pb_{1-x}La_x)$ $(Zr_yTi_{1-y})_{1-x/4}O_3$)]abbreviated as PLZT, lithium niobate ($LiNbO_3$), and lithium tantalate ($LiTaO_3$). A waveguide 81 similar to the waveguide 24 is formed on the substrate 80. On the waveguide 81, there are formed three electrode layers 82 in spaced-apart relation with each other. These three electrode layers 82 are disposed with the crystal orientation of the substrate 80 taken into consideration. Namely, the electrode layers 80 are disposed such that the laser beam incident upon the element 78 is passed between the first and second electrodes, and such that the third electrode extends obliquely between the first and second electrodes, as shown in FIG. 5(A). A controlled voltage corresponding to the tracking error signal Vt is applied from a tracking control circuit 84 to the electrode layers 82. As a result, the laser beam travelling through the waveguide is deflected as indicated in dashed line in FIG. 5.

In the third embodiment of FIG. 5(B), the optical deflector element 88 consists of an acousto-optical element which utilizes an acousto-optical effect. The element 88 includes a transparent substrate 90. For example, the substrate 90 is formed of lithium niobate ($LiNbO_3$), and is provided with a waveguide 91 (similar to the waveguide 24), and a comb-like oscillator 92 for generating a surface acoustic wave (SAW). The oscillator 92 is connected to a high-frequency power source 94, so that the wavelength of the surface acoustic wave may be controlled based on the tracking error signal Vt. The refractive index of the acousto-optical element 88 is changed according to the wavelength of the surface acoustic wave controlled by the power source 94.

These two modified tracking servo devices utilizing the electro-optical or acousto-optical effect have the same advantages as the preceding embodiment utilizing the thermo-optical effect.

While the present invention has been described in its preferred embodiments, it is to be understood that the invention is not limited to the precise details of the illustrated embodiments, but may be embodied with various changes, modifications and improvements, which may occur to those skilled in the art, without departing from the scope of the invention defined in the following claims.

What is claimed is:

1. A tracking servo device for changing a position on an optical storage disk at which the storage disk is irradiated by a light beam, said servo device being responsive to a tracking error signal indicative of a deviation of said position with respect to a recording track provided on a surface of said storage disk, said servo device comprising:

an optical deflector element including a substrate having a flat surface which is substantially perpendicular to said surface of said storage disk, said optical deflector element comprising a thermo-optical element, and a waveguide formed on said flat surface of said substrate and disposed in a path of said light beam for guiding said light beam therethrough toward said surface of said optical storage disk so as to deflect said light beam during propagation thereof through said waveguide, said optical deflector element emitting the deflected light beam from an end face of said waveguide opposite to said surface of the storage disk; and deflector control means for controlling an angle of deflection of said light beam by said optical deflector element, based on said tracking error signal, said deflector control means comprising means for changing a temperature gradient in said optical waveguide.

2. A tracking servo device according to claim 1, wherein said thermo-optical element comprises a heat-generating layer formed on said waveguide and having lateral edges parallel to said path of the light beam, said waveguide having a higher refractive index than that of said substrate, said means for changing a temperature gradient comprising means for controlling an electric current applied to said heat-generating layer.

3. A tracking servo device for changing a position on an optical storage disk, at which the storage disk is irradiated by a light beam, said servo device being responsive to a tracking error signal indicative of a deviation of said position with respect to a recording track provided on a surface of said storage disk, said tracking servo device comprising:

a thermo-optical deflector element including a transparent substrate having a flat surface, a waveguide formed on said flat surface of said substrate and disposed in a path of said light beam for guiding said light beam therethrough toward said surface of said optical storage disk, and a heat-generating layer formed on said waveguide so as to deflect said light beam during propagation thereof through said waveguide, said heat-generating layer having lateral edges parallel to said path of the light beam; and means for controlling an electric current applied to said heat-generating layer, to change a temperature gradient in said waveguide and thereby control an angle of deflection of said light beam by said thermo-optical deflector element, based on said tracking error signal.

* * * * *